United States Patent
Lambert

(10) Patent No.: US 8,211,212 B2
(45) Date of Patent: Jul. 3, 2012

(54) MIXED IRON-MANGANESE OXIDES FOR HIGH-TEMPERATURE OXYGEN PRODUCTION

(75) Inventor: Arnold Lambert, Chavanay (FR)

(73) Assignee: IFP, Cedex (FR)

( * ) Notice: Subject to any disclaimer, the term of this patent is extended or adjusted under 35 U.S.C. 154(b) by 252 days.

(21) Appl. No.: 12/768,785

(22) Filed: Apr. 28, 2010

(65) Prior Publication Data

US 2010/0278719 A1 Nov. 4, 2010

(30) Foreign Application Priority Data

Apr. 29, 2009 (FR) ...................................... 09 02095

(51) Int. Cl.
*B01D 53/02* (2006.01)

(52) U.S. Cl. .......................................... 95/138; 423/579
(58) Field of Classification Search ..................... 95/138; 423/579

See application file for complete search history.

(56) References Cited

U.S. PATENT DOCUMENTS

| | | | |
|---|---|---|---|
| 3,526,675 A | 9/1970 | Croce et al. | |
| 3,957,691 A | 5/1976 | Adachi et al. | |
| 4,072,608 A | 2/1978 | Farha, Jr. et al. | |
| 4,110,082 A * | 8/1978 | Michaels-Christopher | 44/451 |
| 5,240,495 A * | 8/1993 | Dieckmann et al. | 75/392 |
| 6,059,858 A | 5/2000 | Lin et al. | |
| 6,241,955 B1 * | 6/2001 | Alvarez, Jr. | 423/210 |
| 6,281,152 B1 * | 8/2001 | Mifune et al. | 501/32 |
| 6,524,544 B1 * | 2/2003 | Alvarez et al. | 423/352 |
| 6,776,970 B1 | 8/2004 | Vergani et al. | |
| 6,824,575 B1 | 11/2004 | Otomo et al. | |
| 2004/0065078 A1 * | 4/2004 | Schafer-Sindlinger et al. | 60/295 |
| 2004/0076575 A1 * | 4/2004 | Alvarez et al. | 423/437.1 |
| 2005/0176588 A1 | 8/2005 | Bulow et al. | |
| 2005/0176589 A1 | 8/2005 | Bulow et al. | |
| 2005/0226798 A1 | 10/2005 | Bulow et al. | |
| 2005/0265912 A1 * | 12/2005 | Alvarez, Jr. et al. | 423/224 |
| 2011/0300060 A1 * | 12/2011 | Guillou et al. | 423/579 |

FOREIGN PATENT DOCUMENTS

| | | |
|---|---|---|
| FR | 2 895 272 A1 | 6/2007 |
| GB | 674828 | 7/1952 |
| JP | 63-197548 | 8/1988 |
| WO | WO 2007/039687 A1 | 4/2007 |

OTHER PUBLICATIONS

Tomyama et al.; Manganese ferrite catalysts for ozone decomposition, Chemical Abstracts, American Chemical Society, US, Jan. 23, 1989, pp. 378, vol. 110, No. 4.

* cited by examiner

*Primary Examiner* — Robert J Hill, Jr.
*Assistant Examiner* — Christopher P Jones
(74) *Attorney, Agent, or Firm* — Antonelli, Terry, Stout & Kraus, LLP.

(57) ABSTRACT

The invention relates to the use of materials of mixed iron-manganese oxide type for high-temperature oxygen production, notably by separation of oxygen from air, and said materials can be reversibly reduced at high temperature when subjected to an oxygen partial pressure decrease and oxidized when the oxygen partial pressure is higher. The oxidized form of mixed iron-manganese oxides has a bixbyite and/or hematite structure.

10 Claims, No Drawings

MIXED IRON-MANGANESE OXIDES FOR HIGH-TEMPERATURE OXYGEN PRODUCTION

FIELD OF THE INVENTION

The invention relates to materials for high-temperature oxygen production, notably by separation of oxygen from air, and said materials can be reversibly reduced at high temperature when subjected to an oxygen partial pressure decrease and oxidized when the oxygen partial pressure is higher.

The materials comprise mixed iron-manganese oxides whose oxidized form has a bixbyite and/or hematite structure.

BACKGROUND OF THE INVENTION

In a context of increasing world energy demand, capture of carbon dioxide for sequestration thereof has become an imperative necessity in order to limit greenhouse gas emissions harmful to the environment.

Oxycombustion is one of the promising methods for energy production involving $CO_2$ capture. Such a method is for example described in patent WO-07,039,687 A. Implementation of this method requires an oxygen production unit that can supply the oxycombustion chamber with oxygen, pure or diluted in a $CO_2$ and/or steam stream.

Another energy production method involving $CO_2$ capture is pre-combustion separation of $CO_2$ by means of IGCC (Integrated Gasification Combined Cycle) type plants, whose principle is described in U.S. Pat. No. 6,824,575. As for oxycombustion, this technology requires an oxygen production unit that can supply a gasification unit with oxygen, pure or diluted in a steam and/or $CO_2$ stream.

Also, the production of synthesis gas ($CO+H_2$) from various carbon-containing raw materials such as coal, petroleum, natural gas, biomass is a key stage in the production of synthesis fuels or hydrogen, which requires oxygen as free of nitrogen as possible so as to avoid diluting the synthesis gas obtained.

In all these cases, it is important to avoid or at least to minimize the presence of nitrogen. On the other hand, it can be advantageous to use a mixture of oxygen and of an inert gas, which can be steam and/or carbon dioxide, easy to separate from oxygen or that can be used as they are, depending on applications.

Currently, the most commonly used technology for production of sufficient amounts of oxygen for this type of methods is air separation by cryogenic distillation, but the energy cost of this technology is high because it requires cooling the air to a very low temperature to allow distillation thereof. The cold oxygen obtained then has to be heated prior to being fed into the oxycombustion chamber or the gasification unit. Furthermore, the production cost of the oxygen obtained considerably increases with the desired purity, and the high energy consumption leads to additional $CO_2$ emissions.

It would therefore be advantageous to have a high-temperature (500° C.-1100° C.) oxygen production method in order to limit the $CO_2$ capture cost.

U.S. Pat. No. 6,059,858, the contents of which are incorporated herein by reference, describes a high-temperature oxygen production technology by selective sorption of the oxygen in the air based on the CAR (Ceramic Autothermal Recovery) process: a ceramic material first reacts selectively with the oxygen in the air, and this oxygen is then desorbed by the material under the action of a decrease in the oxygen partial pressure, created by placing the material under vacuum or by purging it with an inert gas (steam, $CO_2$ or mixture) at constant temperature (partial pressure swing process). The sorption-desorption stages are repeated cyclically, and using several fixed-bed reactors arranged in parallel allows to generate a sufficient oxygen-enriched $CO_2$/steam stream.

A variant of the ceramic regeneration stage consists in raising the temperature at constant pressure (temperature swing process).

Patent FR-2,895,272, the contents of which are incorporated herein by reference, also describes a continuous high-temperature oxygen production method based on the adsorption/desorption properties of perovskite or fluorite type ceramics used in a rotating cylindrical reactor.

The efficiency of these methods first of all depends on the properties of the ceramic material used: oxygen selectivity, oxygen transfer capacity, sorption/desorption kinetics and physico-chemical stability.

These methods require using materials that react reversibly with oxygen according to the temperature and pressure conditions. Several materials meeting these criteria are described in patent applications US-2005/0,176,588, US-2005/0,176,589 and US-2005/0,226,798, among which perovskites, brownmillerites, supraconductive materials of YBaCuO type and mixed oxides of doped ceria and zirconia type. All these materials are known, within a certain temperature range, for their mixed ionic and electronic conduction properties (MIECs, Mixed Ionic Electronic Conductors) and they exhibit, in addition to these conduction properties, a relatively high oxygen sorption capacity. The defects of the various structures (oxygen vacancies, interstitial oxygen sites) allow the materials to react with oxygen at high temperature (they become "laden" with oxygen) and to desorb all or part of this oxygen depending on the temperature and pressure conditions (when the $O_2$ partial pressure $P_{O2}$ decreases or when temperature T increases). Patent US-2005/0,176,588 also claims the addition of simple metallic oxides ($MO_n$, n=0.5, 1, 1.5, 2, M=Cu, Co, Ni, Bi, Pb, V, Mn, Cr) to the MIECs described above, in order to increase the oxygen transfer capacity of the composite material obtained.

OBJECTS OF THE INVENTION

The invention relates to the use of mixed iron-manganese type oxides of general formula $(Mn_xFe_{1-x})_2O_3$, where x ranges between 0.10 and 0.99 for oxygen production at a temperature greater than or equal to 500° C.

The mixed oxides according to the invention can be used in any type of oxygen production method. The invention therefore also relates to a high-temperature oxygen production method using an active mass comprising at least one mixed iron-manganese type oxide of general formula $(Mn_xFe_{1-x})_2O_3$, where x ranges between 0.10 and 0.99, advantageously by separation of oxygen from air.

DESCRIPTION OF THE INVENTION

Summary of the Invention

The invention relates to the use of mixed iron-manganese oxides of general formula $(Mn_xFe_{1-x})_2O_3$, where x ranges between 0.10 and 0.99 for oxygen production at a temperature greater than or equal to 500° C.

x preferably ranges between 0.25 and 0.95, more preferably between 0.4 and 0.95, and x most preferably ranges between 0.75 and 0.95. Advantageously, the operating temperature is at least 800° C., and the temperature more preferably ranges between 900° C. and 1100° C.

The invention also relates to a method of producing oxygen at a temperature greater than or equal to 500° C. using an active mass comprising at least one mixed iron-manganese type oxide of general formula $(Mn_xFe_{1-x})_2O_3$, where x ranges between 0.10 and 0.99. x preferably ranges between 0.25 and 0.95, more preferably between 0.4 and 0.95, and x most preferably ranges between 0.75 and 0.95.

The active mass can also comprise a ceramic binder. The ceramic binder is preferably selected from among alumina, spinel type aluminates, silica, titanium dioxide, kaolin, ceria-zirconia, bentonite or used catalysts.

The method according to the invention can be implemented by separation of oxygen from air. Advantageously, the method is carried out at a temperature greater than or equal to 800° C., more preferably between 900° C. and 1100° C.

In the method according to the invention, the value of x can be selected in an optimized way depending on the temperature of the method.

DETAILED DESCRIPTION

The present invention relates to the use of mixed iron and manganese oxides for high-temperature oxygen production.

The present invention also relates to an oxygen production method using an active mass comprising at least one mixed iron and manganese oxide. The method of the invention can be advantageously implemented according to known PSA (Pressure Swing Adsorption) or TSA (Temperature Swing Adsorption) type methods.

Surprisingly enough, mixed iron-manganese oxides allow to produce a substantially larger amount of oxygen than the materials described in the patents from the prior art at high temperature, i.e. for temperatures greater than or equal to 500° C.

In fact, unlike MIEC type materials, oxygen production is linked with a chemical reaction of the mixed oxide, caused by partial pressure variations at a given temperature. The oxidized form of the mixed oxide is reduced when it is subjected to a low oxygen partial pressure and the reduced form of the mixed oxide is oxidized when it is subjected to a high oxygen partial pressure.

Mixed iron-manganese oxides also have a different behaviour from simple iron (hematite) and manganese (bixbyite) oxides that cannot be used at high temperature for oxygen production.

In fact, when the iron oxide in hematite form ($Fe_2O_3$) is heated under air at atmospheric pressure up to a temperature of 900° C. or 950° C., then subjected to an oxygen partial pressure variation between $P(O_2)=0.21$ and $P(O_2)<0.001$, no significant mass variation of the sample is observed. The iron oxide $Fe_2O_3$ is stable under such temperature and oxygen pressure conditions.

On the other hand, when heating under air ($P(O_2)=0.21$ atm) the manganese oxide $MnO_2$, this oxide undergoes a first decomposition around 550° C., according to reaction (1), so as to yield bixbyite ($Mn_2O_3$). This reduction of $MnO_2$ to $Mn_2O_3$ is accompanied by a 10 mass % oxygen evolution and it is irreversible at $P(O_2) \leqq 0.21$ atm. A second irreversible decomposition is observed around 950° C., according to reaction (2), releasing 3.3 mass % oxygen. The manganese oxides $MnO_2$ and $Mn_2O_3$ are thus unstable under air at high temperature at oxygen partial pressures less than or equal to 0.21 atm. When heating bixbyite $Mn_2O_3$ under air at 900° C., the oxide is stable as long as the oxygen partial pressure is equal to 0.21 atm. At 900° C., when the oxygen partial pressure decreases ($P(O_2)<0.0001$), the oxide undergoes a loss of mass of about 3.4% corresponding to the reduction of the bixbyite to hausmannite according to reaction (2). This reduction is irreversible because hausmannite does not re-oxidize when the oxygen partial pressure is increased, still at 900° C. When the temperature is raised under air up to 950° C., no additional oxygen release is observed, not even when the hausmannite is subjected, at this temperature, to oxygen partial pressure variations between $P(O_2)=0.21$ and $P(O_2)<0.0001$. $Mn_3O_4$ can therefore not be reduced to MnO or Mn at these temperatures only under the effect of a decrease in the oxygen partial pressure.

$$MnO_2 \rightarrow \tfrac{1}{2}Mn_2O_3 + \tfrac{1}{4}O_2 \qquad \text{Reaction (1)}$$

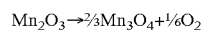

$$Mn_2O_3 \rightarrow \tfrac{2}{3}Mn_3O_4 + \tfrac{1}{6}O_2 \qquad \text{Reaction (2)}$$

Surprisingly enough, unlike simple oxides, when certain mixed iron and manganese oxides are heated to a sufficient temperature (greater than or equal to 500° C., preferably greater than or equal to 800° C.) and subjected to an oxygen partial pressure variation, reaction (3) has been observed, and this reaction is furthermore reversible. When the oxygen partial pressure decreases (from $P(O_2)=0.21$ to $P(O_2)<0.0001$), a loss of mass of the mixed oxides is observed, linked with the reduction of said mixed oxides, releasing at the same time a proportion of gaseous oxygen corresponding to the loss of mass observed. The change from a low oxygen partial pressure to a higher partial pressure leads to a mass gain linked with the re-oxidation of the reduced mixed oxide capturing the oxygen present.

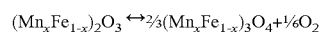

$$(Mn_xFe_{1-x})_2O_3 \leftrightarrow \tfrac{2}{3}(Mn_xFe_{1-x})_3O_4 + \tfrac{1}{6}O_2 \qquad \text{Reaction (3)}$$

These mixed oxides have high oxygen transfer capacities and they can therefore potentially be used for high-temperature oxygen production.

When reaction (3) is total, the theoretical total oxygen transfer capacity of the mixed oxide is reached. The theoretical total capacity for simple iron and manganese oxides is 3.34 mass % and 3.78 mass % respectively. It results therefrom that the theoretical total capacity for the mixed iron-manganese oxides according to the invention ranges between these two values, depending on the value of x.

The oxygen transfer capacity exploited in the invention consists of the reversible fraction of the total capacity. The reversible oxygen transfer capacity notably depends on the composition of the mixed oxide, the time, the temperature and the oxygen partial pressure. One can thus consider using the remaining fraction of the total capacity in different reactions, for example reactions of oxidation of a fuel.

Preparation of the Mixed Iron-manganese Oxides

The mixed iron-manganese oxides can be prepared by means of the sintering method commonly used in the ceramic industry. This method comprises the following operations. The metallic oxides, carbonates or other compounds from which the mixed oxide is formed after a reaction in the solid state are mixed in the desired proportions, homogeneously, then humidified and crushed. After drying, and optionally forming through pressing, the powder obtained is brought to a sufficient temperature ($\geqq 900°$ C.) under air to initiate the chemical reaction between the reactants. In order to improve the homogeneity within the structure of the material, the powder obtained can be crushed and mixed again, then brought to high temperature. These operations can be repeated as often as necessary.

Synthesis of the mixed iron-manganese oxides can also be performed by means of the method referred to as solution combustion synthesis, wherein a mixture of metallic precursors (nitrates, acetates, chlorides, oxalates, . . . ) in desired proportions and of a water-soluble fuel, urea for example, is heated until ignition of the mixture.

Another synthesis method referred to as spray pyrolysis consists in spraying as droplets of controllable size a mixture, in desired proportions, of metallic precursors (nitrates, acetates, chlorides, oxalates, . . . ), then in feeding the aerosol thus formed into an oven maintained at a sufficient temperature, typically above 600° C., so as to evaporate the solvent and to initiate decomposition of the precursors and formation of the mixed oxide. The particles can then be calcined again in an oven.

A variant of this method, referred to as spray drying, simply consists in drying the droplets within the oven (temperature below 300° C., preferably below 200° C.), then in calcining under air the particles obtained at a sufficient temperature to initiate decomposition of the precursors and formation of the mixed iron-manganese oxide.

Preferably, synthesis of the mixed oxides is carried out by co-precipitation of a mixture of metallic precursors selected from the group consisting of nitrates, acetates and chlorides by a base. This base is, for example, soda, potash, sodium or potassium carbonate, or ammonium hydroxide. The precipitate obtained is then washed, dried and calcined at a sufficient temperature to allow formation of the mixed oxides, preferably above 600° C.

Use of the Mixed Fe—Mn Oxides According to the Invention—High-temperature Oxygen Production Method The mixed oxides of composition and of structure $(Mn_xFe_{1-x})_2O_3$ where $0.1 \times 0.99$ are used according to the invention to produce oxygen at high temperature, notably at temperatures greater than or equal to 500° C., preferably greater than or equal to 800° C., and more preferably at temperatures ranging between 900° C. and 1100° C.

Preferably, mixed oxides for which x ranges between 0.25 and 0.95, more preferably between 0.4 and 0.95, and most preferably between 0.75 and 0.95 are used.

Depending on the value of x and on the calcination temperature (generally ranging between 600° C. and 1000° C.), the structure of the mixed oxide is of bixbyite $Mn_2O_3$ type for high values of x (for example greater than or equal to 0.9), of hematite $Fe_2O_3$ type for low values of x (for example less than or equal to 0.1), or a mixture of these two crystallographic phases. Except for cases x=0 (simple iron oxide) and x=1 (simple manganese oxide), the structure of the mixed oxide can be described as a mixture of bixbyite wherein part of the Mn atoms is substituted by Fe and of hematite wherein part of the Fe atoms is substituted by Mn.

A ceramic binder can be added to the mixed iron-manganese oxides in order to increase the mechanical strength thereof. The binders likely to be used are alumina, spinel type aluminates, silica, titanium dioxide, kaolin, ceria-zirconia, bentonite or used catalysts.

The oxygen transfer capacity of the composite material (usable as the active mass in an oxygen production method) is generally proportional to the amount of mixed iron-manganese oxide in the composite material.

The reversible oxygen transfer capacity notably depends on the composition of the mixed oxide, the time, the temperature and the oxygen partial pressure. Each mixed oxide $(Fe_xMn_{1-x})_2O_3$ has an optimum temperature of use. It is thus possible to consider optimization of the formulation of the mixed oxide (variation of x) according to the temperature of use sought for an oxygen production method under given operating conditions.

It is also conceivable to dope the mixed iron-manganese oxides by means of transition metals of groups IIIB to IIB of the periodic table (for example Ti, V, Cr, Co, Ni, Cu, Y, Zr, Mo, La, Ce) or by alkaline (Li, Na, K, Rb, Cs) or alkaline-earth metals (Be, Mg, Ca, Sr, Ba), or by one or more elements of groups IIIA to VA of the periodic table. Such doping, limited to 10 atomic % in relation to Fe+Mn, can allow to increase the oxygen transfer capacity and/or the oxidation and reduction kinetics and/or the mechanical strength of the materials.

The mixed iron-manganese oxides can be used in form of powder in a fluidized bed, or in a fixed bed, in form of balls, extrudates or monoliths. The monolith can either exclusively consist of a mixed iron-manganese oxide, or be coated on the surface of the channels with a ceramic (cordierite, aluminate, perovskite, silicon carbide, mullite, . . . ) or metallic monolith.

The oxygen production method according to the invention can be advantageously implemented for separation of oxygen from air.

EXAMPLES

The examples hereafter illustrate the invention in a non-limitative manner.

Examples 1 to 10

Preparation of the Oxides

The iron oxide $Fe_2O_3$ (comparative example 1) is prepared by co-precipitation of the iron nitrate by soda. The precipitate obtained is then filtered, washed, dried at 120° C. and calcined under air at 1000° C. for two hours.

The manganese oxide $Mn_2O_3$ (comparative example 10) is prepared by co-precipitation of the manganese nitrate by soda. The precipitate obtained is then filtered, washed, dried at 120° C. and calcined under air at 1000° C. for two hours.

The mixed iron-manganese oxides (examples 2 to 9) are prepared by co-precipitation of a mixture of iron and manganese nitrates by soda. The precipitate obtained is then filtered, washed, dried at 120° C. and calcined under air at 1000° C. for two hours.

Example 11

Measurement of the Oxygen Transfer Capacity of the Oxides Prepared in Examples 1 to 10

A SETARAM TAG24 thermobalance is equipped with a gas delivery automaton allowing to simulate the successive reduction/oxidation stages undergone by the particles in a CAR type process.

The tests are carried out at a temperature of 900° C. and possibly 950° C., with 30 mg (±2 mg) sample contained in a Pt boat. In order to allow comparison between the various samples, the size distribution of the particles is selected between 30 and 40 µm by screening. The oxygen desorption gas used is pure nitrogen, and the oxidation gas is dry air.

The temperature rise occurs under air, at a flow rate of 80 ml/min. When the system has reached the set temperature value, after 5-min stabilization under air, some air/nitrogen/air cycles are carried out.

The results are given in Table 1, which shows the oxygen transfer capacity as a function of x (and of the atomic % of Mn/(Mn+Fe)) and of the test temperature for the oxides of examples 1 to 10.

The simple oxides of comparative examples 1 ($Fe_2O_3$) and 10 ($Mn_2O_3$) have a zero oxygen transfer capacity at high temperature (900° C. and 950° C.), which shows the interest of using mixed oxides for high-temperature oxygen production.

In fact, when the iron oxide in hematite form ($Fe_2O_3$) is heated under air at atmospheric pressure to a temperature of 900° C. or 950° C., then subjected to an oxygen partial pressure variation between $P(O_2)=0.21$ and $P(O_2)<0.001$ (example 1), no significant mass variation of the sample is observed. The iron oxide $Fe_2O_3$ is stable under such temperature and oxygen pressure conditions.

On the other hand, although unstable under the same temperature and oxygen pressure conditions, the manganese oxide $Mn_2O_3$ (example 10) is irreversibly reduced to $Mn_3O_4$ and the simple manganese oxide can therefore not be used in a high-temperature oxygen production method.

However, a small percentage of iron (10 atomic %: example 9) allows to obtain a high reversible oxygen transfer capacity: 3.05 mass % at 900° C.

The oxygen transfer capacity of the material prepared according to example 6 ($Fe_{0.5}Mn_{0.5})_2O_3$ was measured at 900° C. and at 950° C. At 900° C., the material loses about 1.3 wt. % when the partial pressure of the oxygen ranges between that of the air (0.21 atm) and that of the pure nitrogen ($P(O_2)$ <0.0001 atm). This loss of mass is linked with the reduction of the material according to reaction (3). When the material is again exposed to an oxygen partial pressure of 0.21 atm, the reaction takes place in the reverse direction (oxidation), and the material is regenerated, ready to release the oxygen it has just captured in a subsequent cycle. At 950° C., the reversible oxygen transfer capacity of the material is much higher, of the order of 2.5 mass % after 18 successive cycles.

TABLE 1

| Example | x | Mn/(Mn + Fe) atomic % | Test temperature ° C. | Measured oxygen transfer capacity mass % |
|---|---|---|---|---|
| 1 (comparative) | 0 | 0 | 900 | 0 |
| | | | 950 | 0 |
| 2 | 0.1 | 10 | 900 | 0.05 |
| | | | 950 | 0.09 |
| 3 | 0.2 | 20 | 900 | 0.20 |
| | | | 950 | 0.30 |
| 4 | 0.25 | 25 | 900 | 0.25 |
| | | | 950 | 0.55 |
| 5 | 0.4 | 40 | 900 | 0.30 |
| | | | 950 | 1.8 |
| 6 | 0.5 | 50 | 900 | 1.3 |
| | | | 950 | 2.5 |
| 7 | 0.75 | 75 | 900 | 1.05 |
| 8 | 0.8 | 80 | 900 | 2.2 |
| 9 | 0.9 | 90 | 900 | 3.05 |
| 10 (comparative) | 1 | 100 | 900 | 0 |
| | | | 950 | 0 |

The invention claimed is:

1. Method of producing oxygen at a temperature greater than or equal to 500° C. comprising: providing an active mass comprising at least one mixed iron-manganese oxide of general formula $(Mn_xFe_{1-x})_2O_3$, where x ranges between 0.10 and 0.99, and heating the active mass in air to a temperature greater than or equal to 500° C. to oxidize the active mass to $(Mn_xFe_{1-x})_2O_4$, then decreasing the oxygen partial pressure, thereby reducing the active mass to $(Mn_xFe_{1-x})_2O_3$ and releasing oxygen.

2. Oxygen production method as claimed in claim 1, wherein x ranges between 0.25 and 0.95.

3. Oxygen production method as claimed in claim 2, wherein x ranges between 0.4 and 0.95.

4. Oxygen production method as claimed in claim 3, wherein x ranges between 0.75 and 0.95.

5. Oxygen production method as claimed in claim 1, wherein the active mass also comprises a ceramic binder.

6. Oxygen production method as claimed in claim 5, wherein the ceramic binder is selected from among alumina, spinel type aluminates, silica, titanium dioxide, kaolin, ceria-zirconia, bentonite or used catalysts.

7. Oxygen production method as claimed in claim 1, comprising separating oxygen from air.

8. Oxygen production method as claimed in claim 1, wherein the temperature is greater than or equal to 800° C.

9. Oxygen production method as claimed in claim 1, wherein the temperature ranges between 900° C. and 1100° C.

10. Oxygen production method as claimed in claim 1, wherein the value of x is selected in an optimized way depending on the temperature of the method.

* * * * *